(12) United States Patent
Younes et al.

(10) Patent No.: US 11,168,673 B2
(45) Date of Patent: Nov. 9, 2021

(54) GEOTHERMAL ENERGY RECOVERY PROCESS WITH SELECTIVE RECIRCULATION

(71) Applicant: Saudi Arabian Oil Company, Dhahran (SA)

(72) Inventors: Mourad Younes, Dhahran (SA); Aadesh Harale, Dhahran (SA); Aqil Jamal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/679,918

(22) Filed: Nov. 11, 2019

(65) Prior Publication Data

US 2021/0140684 A1  May 13, 2021

(51) Int. Cl.
*F03G 7/04* (2006.01)
*F24T 10/20* (2018.01)
(Continued)

(52) U.S. Cl.
CPC ............ *F03G 7/04* (2013.01); *E21B 43/164* (2013.01); *E21B 43/34* (2013.01); *F01K 25/06* (2013.01);
(Continued)

(58) Field of Classification Search
CPC ... F24T 10/20; F24T 2010/50; F24T 2010/56; F24T 2201/00; F03G 7/04; F01K 25/06;
(Continued)

(56) References Cited

U.S. PATENT DOCUMENTS

| 5,656,172 A * | 8/1997 | Kitz ..................... C02F 1/66 |
| | | 210/696 |
| 8,826,638 B1 * | 9/2014 | Gurin ..................... F01K 3/18 |
| | | 60/39.6 |

(Continued)

FOREIGN PATENT DOCUMENTS

| WO | 2010104599 A2 | 9/2010 |
| WO | 2014015307 A1 | 1/2014 |
| WO | 2014075071 A2 | 5/2014 |

OTHER PUBLICATIONS

Feng et al. "Exploration and Analysis of CO2+ Hydrocarbons Mixtures as Working Fluids for Trans-critical ORC." Energy Procedia 129 (2017): 145-151.
(Continued)

*Primary Examiner* — Mark A Laurenzi
*Assistant Examiner* — Xiaoting Hu
(74) *Attorney, Agent, or Firm* — Leason Ellis LLP (57) ABSTRACT

A system method of geothermal energy recovery includes injecting carbon dioxide into a geothermal reservoir through an injection well, extracting a working fluid including previously injected carbon dioxide and hydrocarbons entrained in a flow of the carbon dioxide within the reservoir from an extraction well, separating components of the heated working fluid based on chemical composition, selectively mixing the separated components according to the current conditions of the extracted working fluid to produce an output modified working fluid that having a chemical composition that is optimized for energy recovery efficiency, and expanding the modified working fluid to generate mechanical or electrical energy.

18 Claims, 4 Drawing Sheets

(51) Int. Cl.
*F01K 25/06* (2006.01)
*F01K 25/10* (2006.01)
*E21B 43/16* (2006.01)
*E21B 43/34* (2006.01)
*F24T 10/00* (2018.01)

(52) U.S. Cl.
CPC ............ *F01K 25/103* (2013.01); *F24T 10/20* (2018.05); *F24T 2010/56* (2018.05); *Y02E 10/10* (2013.01)

(58) Field of Classification Search
CPC ...... F01K 25/103; E21B 43/164; E21B 43/34; E21B 43/40
See application file for complete search history.

(56) References Cited

U.S. PATENT DOCUMENTS

| | | | |
|---|---|---|---|
| 2007/0261844 | A1 | 11/2007 | Cogliandro et al. |
| 2008/0289819 | A1* | 11/2008 | Kaminsky .............. C01B 3/34 166/256 |
| 2012/0001429 | A1* | 1/2012 | Saar .................... F03G 7/04 290/52 |
| 2012/0067568 | A1 | 3/2012 | Palmer et al. |
| 2013/0043678 | A1* | 2/2013 | Saar .................... F02C 1/005 290/2 |
| 2014/0130498 | A1* | 5/2014 | Randolph ............ E21B 43/24 60/645 |

OTHER PUBLICATIONS

Kravanja et al. "Heat transfer performance of CO2, ethane and their azeotropic mixture under supercritical conditions" Energy 152(2018): 190-201.

Cáceres et al. "Thermodynamic Optimization Of An Organic Rankine Cycle For Power Generation From A Low Temperature Geothermal Heat Source." Proceedings of the 58th Conference on Simulation and Modelling (SIMS 58) Reykjavik, Iceland, Sep. 25-27, 2017. No. 138. Linköping University Electronic Press, 2017.

International Search Report and Written Opinion in Corresponding PCT Application No. PCT/US2020/057971 dated Feb. 3, 2021. 14 pages.

* cited by examiner

GEOTHERMAL ENERGY RECOVERY PROCESS WITH SELECTIVE RECIRCULATION

FIELD OF THE DISCLOSURE

The present disclosure concerns a method and system for recovering geothermal energy that uses supercritical $CO_2$ and mixtures as a working fluid.

BACKGROUND OF THE DISCLOSURE

It has long been known that temperature within the earth sub-surface increases with depth and efforts have been made to "mine" this heat energy for heating and generating electricity. With the rising concerns of climate change and greenhouse gas emissions, governments and companies are looking for ways to reduce their energy intensity and carbon footprint. Renewable energy such as solar, wind and geothermal is often part of the technology portfolio especially with the rapid decrease of renewable energy prices due to significant research and mass deployment.

Oil and gas companies are among those most interested in reducing their energy intensity and carbon footprint so as to provide energy products with the lowest environmental impact. Many Oil and Gas (O&G) companies have adopted renewable energy in their operations seek to leverage O&G industry expertise to advance carbon capture utilization and sequestration. The O&G industry is particularly well suited to aid in carbon sequestration because of its significant underground reserves in which carbon can be stored, and its experience and knowledge of subsurface science and reservoirs.

The aims of carbon usage and sequestration with geothermal energy production can be simultaneously satisfied by using carbon dioxide ($CO_2$) as a working fluid for capturing geothermal energy. This allows large volumes of carbon dioxide to be stored underground, used for energy capture, and recycled. However, the temperature and pressure of the $CO_2$ has to be maintained at elevated levels to capture geothermal energy efficiently. In this regard, supercritical $CO_2$ ($CO_2$ beyond the triple point in the temperature pressure phase graph, when the underground conditions allows it) has shown the potential to supersede many existing geothermal capture technologies.

$CO_2$ cycles efficiency is very dependent on the ambient conditions, especially if the ambient temperature goes above the $CO_2$ critical point, leading to energy intensive gas or supercritical $CO_2$ compression as compared to liquid $CO_2$ compression below the $CO_2$ triple point temperature. It has been reported by Kravanja et al. in "Heat Transfer Performance of $CO_2$, Ethane and their Azeotropic Mixture" that an azeotropic ethane-$CO_2$ mixture can, under some conditions, be more efficient as working fluid in energy systems compared to pure $CO_2$.

SUMMARY OF THE DISCLOSURE

In light of problems with using supercritical $CO_2$ under high ambient temperature conditions, the present disclosure provides systems and methods for adapting geothermal recovery to high temperature conditions by working fluid composition control.

In one embodiment, a system for geothermal energy recovery is provided. The system comprises a phase separator having an input port coupled to the extraction well and receiving an extracted working fluid including carbon dioxide and hydrocarbons therefrom, the phase separator operative to separate liquid and vapor portions the extracted working fluid, a controllable separator unit coupled downstream from the phase separator and receiving the vapor portion of the extracted working fluid therefrom, the separator unit being controllably operated to separate components of the received working fluid based on chemical composition and to selectable mix the separated components into a modified working fluid based on detected process and ambient conditions, and an expander coupled downstream from the controllable separator unit and operable to generate mechanical or electrical energy from expansion of the modified working fluid.

In some embodiments, the geothermal energy recovery system further comprises a condenser coupled downstream from the expander operable to cool the expanded working fluid, and a compression device coupled downstream from the condenser operable to increase the pressure of the working fluid received from the condenser to a pressure level suited for re-injection into the reservoir via the injection well. In certain implementations, wherein additional carbon dioxide is introduced into the working fluid between the expander and the condenser or downstream the condenser depending on the additional carbon dioxide conditions.

The separator unit can be operated using a programmable electronic control unit that is configured to operate the separator unit to set a composition of the working fluid based upon detected ambient and process conditions received by the electronic control unit. In some implementations, when electronic control unit determines that the extracted working fluid temperature in the cycle can reach below the critical point temperature of carbon dioxide, the electronic control unit operates the separator unit to set a composition of the working fluid at between 100 carbon dioxide: 0 percent ethane and 60 percent carbon dioxide: 40 percent ethane depending another process or ambient condition. Conversely, if the electronic control unit determines that the extracted working fluid temperature is would be above the critical point temperature, the electronic control unit can operate the separator unit to set a composition of the working fluid to include carbon dioxide, ethane and at least one heavier hydrocarbon. In another embodiment, the electronic control unit can be operated to maximize the $CO_2$ sequestration and therefore operate the separator unit to maximize the recovery and rejection of the hydrocarbons and maximizing the recycle of $CO_2$.

The present disclosure also provides a method of geothermal energy recovery. Embodiments of the method include steps of injecting carbon dioxide into a geothermal reservoir through an injection well, extracting a working fluid including previously injected carbon dioxide and hydrocarbons entrained in a flow of the carbon dioxide within the reservoir from an extraction well, separating components of the heated working fluid based on chemical composition, selectively mixing the separated components according to the current conditions of the extracted working fluid to produce an output modified working fluid that having a chemical composition that is optimized for energy recovery efficiency, and expanding the modified working fluid to generate mechanical or electrical energy.

In certain embodiments, the method further comprises separating the extracted working fluid according to phase into vapor and liquid streams prior to separating according to composition, wherein the vapor stream is thereafter separated based on chemical composition.

Embodiments of the method further includes condensing the expanded modified working fluid, compressing the condensed modified working fluid to increase pressure, and reinjecting carbon dioxide at elevated pressure into the reservoir through the injection well.

In certain implementations, the method can include introducing additional carbon dioxide into the modified working fluid prior to condensing.

The extracted working fluid stream can be separated into i) a carbon dioxide stream, ii) a light hydrocarbon stream, and ii) a heavy hydrocarbon stream. In some implementations, if the extracted working fluid has a temperature below the critical point temperature of carbon dioxide, the modified working fluid composition is set between 100 carbon dioxide: 0 percent ethane and 60 percent carbon dioxide: 40 percent ethane depending another process or ambient condition.

Conversely, if the extracted working fluid has a temperature above the critical point temperature, the modified working fluid composition is set to include carbon dioxide, ethane and at least one heavier hydrocarbon. In certain instances of the latter case, the modified working fluid composition is set to include 50 percent carbon dioxide, 30 percent ethane and 20 percent propane.

Embodiments of the method can further comprise heating the extracted working fluid to an elevated temperature by introducing the extracted working fluid with additional oxygen into an oxidation unit prior to separating the extracted working fluid based on composition. In additional embodiments, the method further comprising heating the extracted working fluid prior to separating components of the working fluid based on chemical composition.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

Disclosed herein are methods and systems for recovering geothermal energy that use $CO_2$ and $CO_2$ hydrocarbon mixtures as a component of a working fluid. The efficiency of a supercritical $CO_2$ geothermal cycle is dependent upon operating and ambient conditions, especially when ambient temperature rises above the $CO_2$ critical point. Above the $CO_2$ critical point, energy compression can occur whereas only liquid $CO_2$ compression takes place below the triple point temperature. The disclosed method controls the composition and properties of working fluid by adding different types and amounts of hydrocarbons to the $CO_2$ based on the ambient conditions. The selective and controlled mixing allows for optimal cycle efficiency while reducing working fluid compression energy.

More specifically, the methods and systems herein control operation of a separator unit that separates components of the incoming working fluid extracted from the reservoir and then selectively mixes the separated components according to current conditions before the working fluid is expanded and its energy is converted into mechanical or electrical energy.

Figure 1:
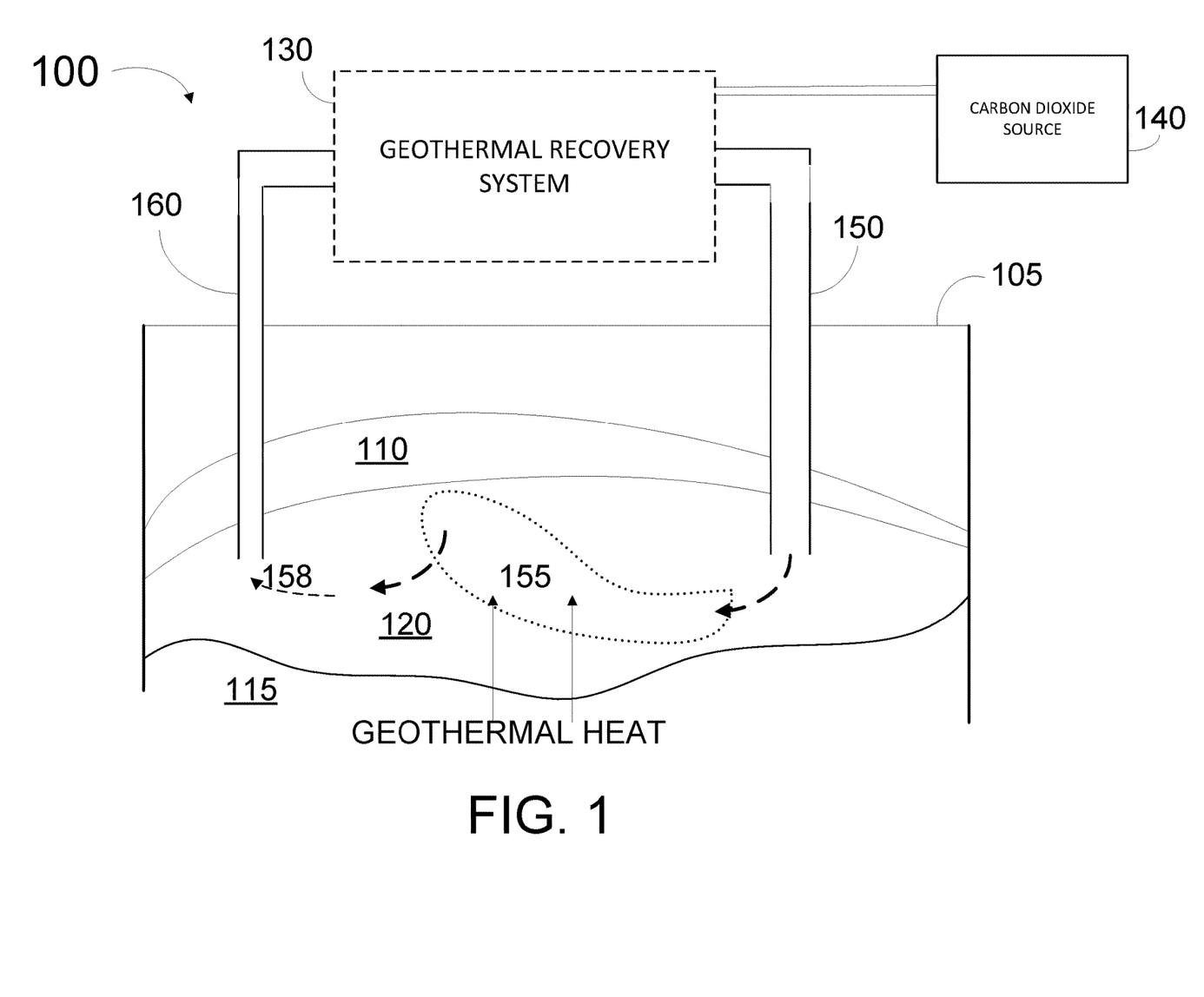
FIG. 1 is a cross-sectional view of a geological reservoir to which the system and method of the present disclosure can be applied.

FIG. 1 is a cross-sectional view of a geothermal recovery system in which the method and system of the present disclosure can be applied. The cross-sectional view shows a geological formation located below surface 105 which includes a hydrocarbon reservoir positioned beneath a caprock layer 110. The reservoir includes a predominantly a porous portion rich in liquid phase 115 and a porous portion rich in gaseous phase 120. The liquid and gaseous rich reservoir portions 115, 120 are located at a depth at which the temperature is elevated compared to the surface temperature and heat can be transferred to the reservoir materials. A geothermal recovery system 130 is positioned above the surface. The recovery system 130 receives carbon dioxide gas from a source 140 as well as an extraction working fluid stream in fluid communication with extraction well 165. The system 130 includes elements such as pumps that can be used to inject carbon dioxide and other gaseous or liquid components down an injection well 150 into the reservoir. The carbon dioxide is injected into the reservoir and dissipates as a plume 155. The injection serves two purposes. It is a way to sequester carbon dioxide underground. In addition, the carbon dioxide and other gases, as will be explained further, act as the working fluid 158 by absorbing the geothermal energy contained in the reservoir.

Figure 2:
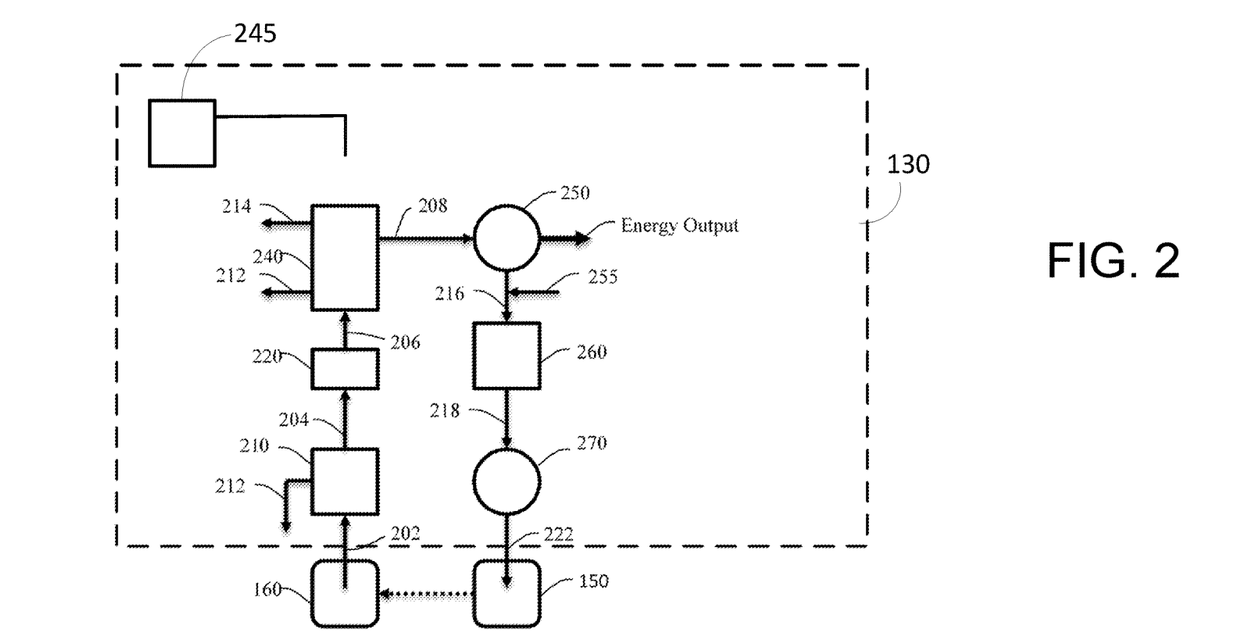
FIG. 2 is a schematic block diagram of an embodiment of a geothermal recovery system according to the present disclosure.

After the working fluid is injected through injection well 150 into the reservoir 120 (in FIG. 1) the fluid migrates through various pathways (represented as dashed lines) toward an extraction well 160 through which the fluid is brought back to the surface. The working fluid is preferably supercritical $CO_2$ or a blend of hydrocarbons with $CO_2$, the hydrocarbons ranging from C1 to C50 (in other words, hydrocarbon molecules having between one and 50 carbon atoms), preferably from C2 to C5. As seen in FIG. 2, discussed, next, a working fluid stream 202 is output from extraction well 160. The composition of the working fluid stream 202 can be different form the composition of the working fluid entering the reservoir via the injection because some of the components carried by the injected working fluid stream migrate to different areas of the reservoir and native fluids can be entrained in the flow into extraction well 160 as the working fluid migrates through the reservoir. The extraction well 160 and/or downstream components of the recovery system 130 include sensors to detect the current conditions of the extracted working fluid, including working fluid temperature and pressure.

Turning now to FIG. 2, a schematic block diagram of an embodiment of a geothermal recovery system according to the present disclosure is shown. Shown at the bottom left, a heated working fluid stream 202 emerges from extraction well 160 and enters recovery system 130. The working fluid 202 can be at pressures ranging between 50 and 300 bar and at temperatures ranging from 0° C. to 300° C. and typically contains both liquid and vapor components. Upon entering recovery system 130, the working fluid 202 is fed to a phase separator 210 component. The phase separator 210 is designed to separate the liquid and vapor components of the working fluid 202. The phase separator 210 can be implemented as a gravity-based or density-based separator that enables separation of a vapor stream from a gas-liquid mixture. The phase separator 210 diverts the liquid components and removes them from the system via stream 212. In certain embodiments, the separated vapor components are output as stream 204 to a heat exchanger 220. At the heat exchanger 220, the working fluid vapor stream 204 is heated using an internal or external source. External heat sources can include a renewable energy source such as solar thermal heating device or an external combustion or oxidation system that can provide energy at temperature above the temperature of working fluid stream 204. However, in alternative embodiments, if additional energy is unavailable, the system 130 can be operated without the heat exchanger 220.

After being heated in embodiments that include heat exchanger 220, a heated stream 206 exits the heat exchanger and is fed into a separation unit 240. The separation unit 240 is operated to take as an input the heated stream 206 and to output, in a first outlet stream, a working fluid 208 with a selected composition. The selected composition is determined by an electronic control unit 245 (such as a programmable processor or specialized electronic control unit) which is configured to receive as input data current process, reservoir, and ambient conditions, including the temperature and pressure of the working fluid entering the system from the extraction well. The control unit 245 is also configured to determine, based on programmed instructions and the input data, a working fluid composition that reduces the compression energy of the working fluid while maximizing energy-recovery efficiency. The separation unit 240 first separates the input stream according to chemical composition into several output streams. Apart from the first output stream 208, a second outlet stream 212 is composed of heavy hydrocarbons (mainly C2 and above) separated from working fluid and, in some embodiments, and a third outlet stream 214 is composed of the lightest hydrocarbons separated from the working fluid, mainly C1 and C2. In some implementations, the second and third outlet streams are combined as a single outlet stream. In some embodiments streams 212 and 214 are expanded separately or jointly to lower pressure to generate additional power. In some embodiments, the separated streams are then blended precisely with $CO_2$ in the first output stream to produce an output working fluid 208 that is optimized for energy recovery based on the current temperature and pressure conditions. In other embodiments, the separation unit 240 can provide directly the first output stream 208 with the desired composition by selectively removing the remaining components from the inlet stream 206 and drawing them out of the process through streams 212 and/or 214.

The separation unit 240 can be implemented using an absorption, or adsorption unit or a membrane system that selectively separates the desired components. For example, separation unit 240 can comprise a membrane separation unit which enables the composition of output stream 208 to be adjusted by operating on different stage cuts with streams 212 and 214 as permeate streams. An example of a membrane material that can allow to do this type of separation is Poly(ether-b-amide) (Pebax). Alternatively, separation unit 240 can be implemented as a pressure swing adsorption (PSA) type unit that uses molecular gate type materials to separate C2, C3 from the rest of the mixture. In this case, $CO_2$ is removed along with the higher hydrocarbons (C3+) and any remaining moisture and other impurities or components. $CO_2$ is then separated from the rest of the components and mixed with the C2, C3 components previously separated. This allows adjustment of the output stream to be optimized for the current conditions.

The composition-controlled output stream 208 exiting separation unit 240 is fed to at least one expansion device 250, such as a turbine, through which the heat energy of the stream is converted into mechanical or electrical energy that is extracted from the system. In some embodiments, the at least one expansion device 250 is implemented as a plurality of devices coupled in series or arranged in parallel. The working fluid emerges from the at least one expansion device 250 at lower pressure in stream 216. The low pressure of stream 216 can range from 10 bar to 200 bar, and preferably from 30 bar to 80 bar. The low pressure stream 216 is fed to a condenser 260 that cools the working fluid to near ambient temperature or near cold sink temperature. Condensed stream 218 exiting the condenser 260 is then fed to a compression device 270. The compression device 270 can be implemented as one or more pumps, compressors, turbo-pumps, and/or turbo-compressors. Stream 222 output from the compression device 270 emerges at a higher pressure relative to stream 218 and, at this elevated pressure, is suitable for injection (or re-injection) into the reservoir through injection well 150.

An additional stream 225 comprising a fresh source of $CO_2$ or hydrocarbons can be introduced upstream or downstream of the condenser 260 (shown being introduced upstream in FIG. 2) depending on the physical state of stream 225. Separator outputs 212, 214 can be processed further (for example, by additional hydrocracking) or the outputs can be recycled back to the reservoir through another injection well (not shown) or through the same injection well 150 via stream 222 downstream compression device 270.

Figure 3:
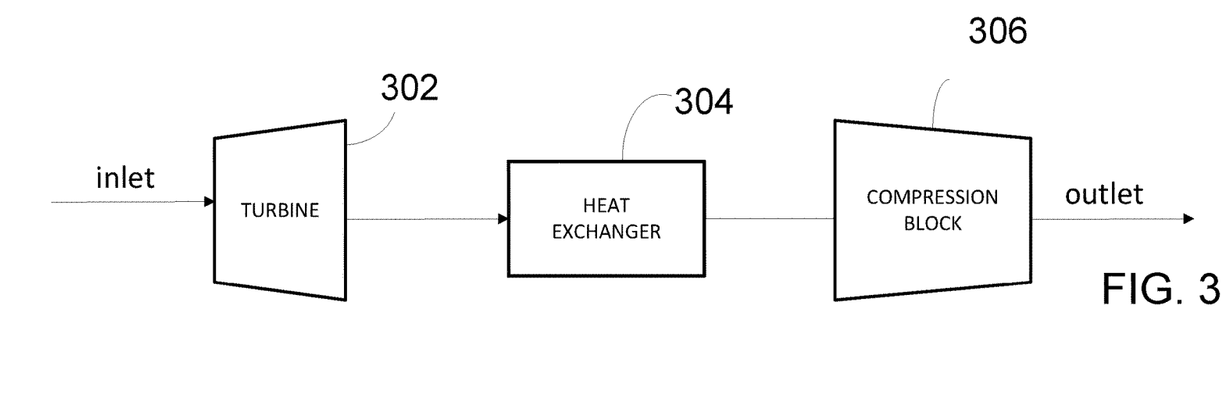
FIG. 3 is schematic diagram of a geothermal recovery model illustrating the energetic components.

The efficiency of the recovery system is improved when the ratio of the amount of energy (work) that is input to compress the working fluid to the amount of energy output by the turbine is reduced. Table 1 provides ratios of compression work to turbine work for different working fluid compositions at different temperatures from a simplified energy recovery system, as shown schematically in FIG. 3. As shown, a working fluid is first expanded in turbine 302, then condensed in heat exchanger 304, and next compressed in compression block 306. Each row of Table 1 provides ratio data for a specific working fluid blend. The lower the ratio value, the higher the efficiency of the system. The inlet stream to the turbine 203 is at 150° C. and 130 bar for all runs.

TABLE I (Efficiency of different working fluid compositions)

| Compression to Expansion ratio | Condensing temperature 25° C. | Condensing temperature 40° C. subcritical pressure (65 bar) | Condensing temperature 40° C. supercritical pressure (80 bar) |
|---|---|---|---|
| 100% $CO_2$ | 32% | 87% | 65% |
| 80% $CO_2$, 20% Ethane | 34% | 81% | 55% |
| 50% $CO_2$, 50% Ethane | 37% | 69% | 49% |
| 50% $CO_2$, 30% Ethane, 20% Propane | 35% | 44% | 43% |

The results shown in Table 1 demonstrate that the efficiency of $CO_2$ alone or in an 80% $CO_2$/20% ethane blend is higher than other more mixed compositions at condensing temperatures below the $CO_2$ critical point temperature (<31° C.). At temperatures above the $CO_2$ critical point (>31° C.), at both subcritical and supercritical pressures, working fluids with additional ethane and heavier hydrocarbons such as propane are the most efficient.

The disclosed system and method enable the composition of the working fluid to be adjusted based on the fluid temperature in order to achieve the optimal efficiency. The adjustments can be made in response to ambient temperature changes or changes in reservoir conditions, for example. Simulations can be performed for the system 130 coupled to the reservoir for various ambient conditions and reservoir pressures to determine the optimal working fluids over temperature and pressure ranges. The control unit 245 of separation unit 240 can be configured with values and other parameters using data obtained from the simulations, in certain implementations. It is noted that in some embodiments the control unit can be incorporated as a component of the separation unit 240 itself.

When operating at condensing temperatures below the $CO_2$ critical point temperature, the separation unit 240 sets the composition of the working fluid to vary between pure $CO_2$ and an azeotropic mixture of $CO_2$ and ethane. When the condensing temperature exceeds the $CO_2$ critical point temperature, the separation unit 240 enables heavier hydrocarbons such as propane to enter the working fluid stream, facilitating the condensation of the working fluid to a liquid state at the elevated temperatures. By facilitating condensation to the liquid state, the required compression energy is minimized.

Figure 4:
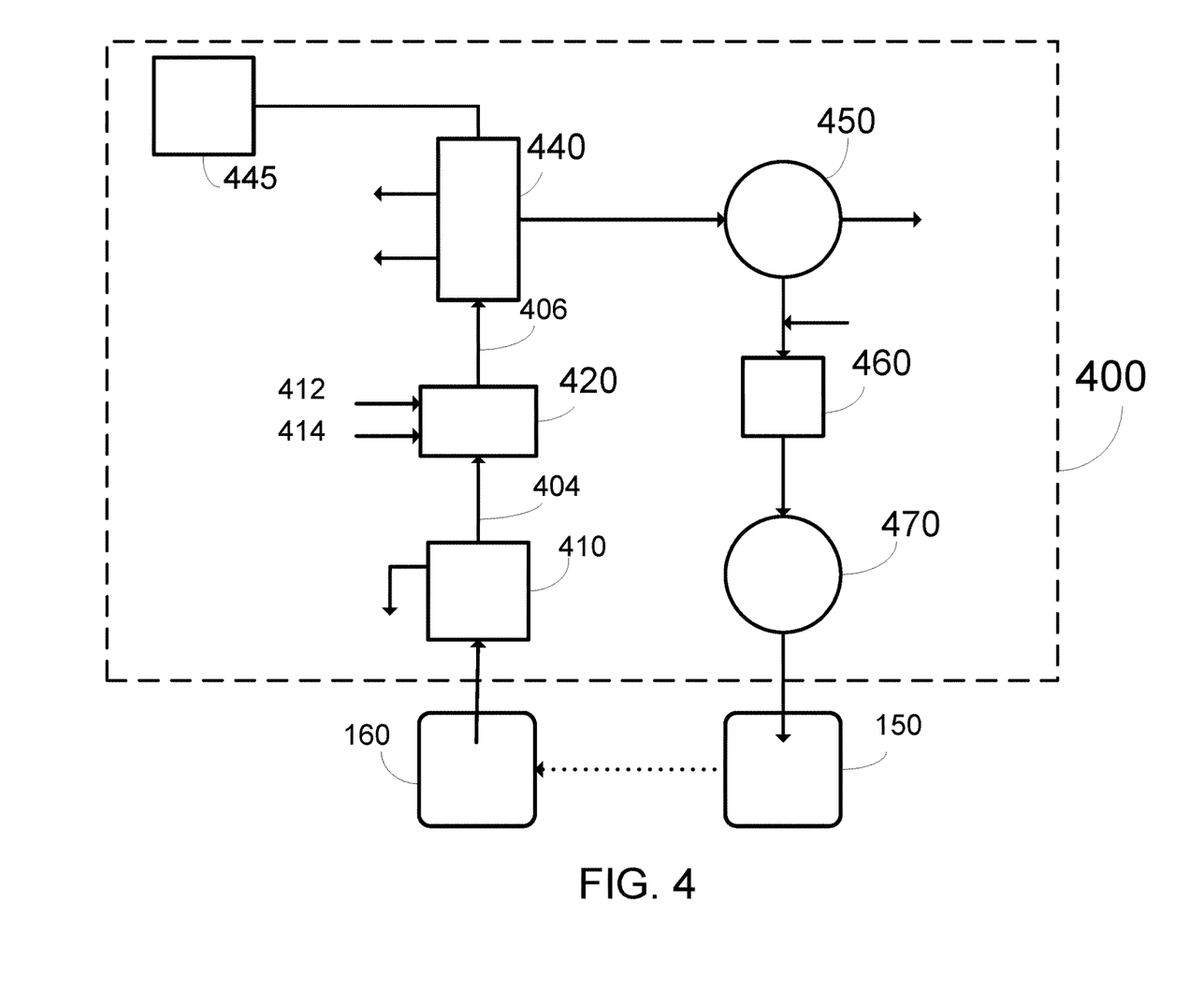
FIG. 4 is a schematic block diagram of another embodiment of a geothermal recovery system according to the present disclosure.

FIG. 4 is a schematic block diagram showing another embodiment of a geothermal energy recovery system according to the present disclosure. The recovery system 400 is adapted to provide higher power output than the arrangement of FIG. 2 by employing intrinsic heat generation. The geothermal recovery system 400 shown in FIG. 4 operates similarly to the system discussed above and shown in FIG. 2 except that in system 400, an oxidation unit 420 is used instead of a heat exchanger. Except as discussed next, the system 400 can be arranged, connected and configured the same as the system 200.

High pressure working fluid 404 output from phase separator 410 enters oxidation unit 420 which also receives an oxygen stream 412. In some embodiments, oxidation unit 420 can receive a stream of water vapor 414 in addition to or as a substitute for oxygen stream 412. The oxygen stream 412 oxidizes hydrocarbons in working fluid stream 404 in an exothermic reaction into $CO_2$ and water vapor, generating substantial heat. The output stream 406 that exits from the oxidation unit 420 is therefore at an elevated temperature with respect to stream 404. Oxidation unit 420 can be implemented using a catalytic bed having a noble metal (Rh, Pt) based catalyst in geometries that provide sufficient surface area (such as monoliths, microliths, etc.) to ensure a low pressure drop through the system as well as to have selective oxidation of the heavier hydrocarbons and any other carbon-based species such as CO.

Depending on the characteristics and native fluid composition of the geothermal reservoir, oxidation unit 420 can provide additional heat to the system to increase the power output. Additionally, oxidation unit 420 can be utilized to complement the operation of separation unit 440 by selectively oxidizing specific species. For example, oxidation unit 420 can be implemented as an oxy-combustion system that non-selectively burns a specific amount of hydrocarbons present in the working fluid up to the depletion of the oxygen content. Additionally, the oxidation unit 420 can be provided with catalysts to promote complete combination of hydrocarbons into water, and also to reduce generation of carbon monoxide (CO). Alternatively, the amount of oxygen supplied through stream 412 can be restricted (e.g., through control valves in a known manner) to limit the consumption of the hydrocarbons to the desired level.

Oxidation unit 420 can be adapted to support the functions of the separation unit 440 by implementing the oxidation unit as a catalytic system that selectively oxidizes hydrocarbons. For example, if the amount of methane ($CH_4$) in the reservoir is low while heavier hydrocarbons are more abundant, oxidation unit 420 can be to selectively oxidize $CH_4$. Operation of the separation unit 440 (via controller 445) can then be modified in tandem with operation of the oxidation unit, in the absence of light hydrocarbons, to separate only the heavier components of the input stream received from the reservoir. Alternatively, when the input from the reservoir has a significant amount of $CH_4$ and low amounts of heavy hydrocarbons (heavier than C2 or C3), the oxidation unit 420 can be adapted (with suitable catalysts and operating temperature) to selectively oxidize the heavier molecules or eventually reform the heavy molecules in the presence of steam or oxygen to produce a methane rich gas and $CO_2$. In this case, the oxidation unit 420 provides a stream with light hydrocarbon and $CO_2$ to separation unit 440. Separation unit 440 is then operated differently based on the different (lighter) input steam.

The remaining components of the embodiment of the geothermal recovery system are similar to those shown in FIG. 2, and include an expansion device 450, a condenser 460 and a compression device 470.

Figure 5:
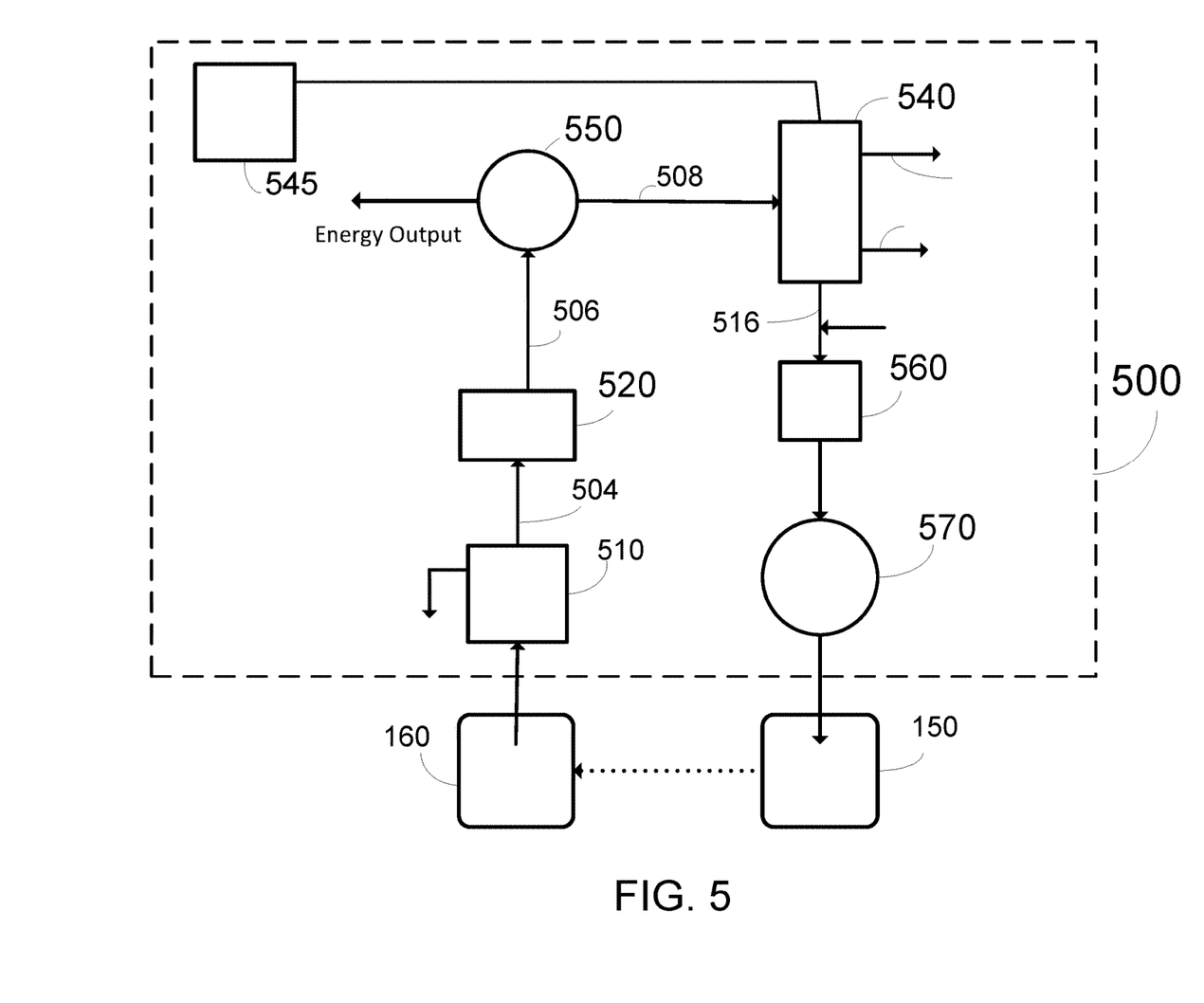
FIG. 5 is a schematic block diagram of a further embodiment of a geothermal recovery system according to the present disclosure.

FIG. 5 shows another embodiment of a geothermal recovery system according to the present disclosure. As in the other embodiments an extracted working fluid stream 502 is fed to phase separator 510 at which liquid and vapor portions of the working fluid are separated. A vapor stream 504 output from phase separator 510 is fed to heater exchanger 520 which outputs a heated working fluid stream 506. However, at this point in the system, this embodiment differs from those shown in FIGS. 2 and 4 in that the output from the heat exchanger 520 is fed to an expansion device 550 rather than to a separator unit 540. In other words, the expansion device 550 is positioned upstream of the separator device 540, which is the reverse in the other embodiments. The heated stream 506 enter into the expansion device 550 where it is expanded, producing work that is converted into mechanical or electrical energy. The resulting expanded and cooled working fluid exits the expansion device 550 as a low-pressure stream 508. The low-pressure stream 508 is s fed to the separation unit 540. The separation unit 540 is operated to take as an input the low-pressure stream 508 and to output, in a first outlet stream, a working fluid 516 with a selected composition. Separation unit 540 operation is similar to the operation described in the embodiments of FIGS. 2 and 4 for separation units 240 and 440. However, separation unit 540 can be implemented using a different separation mechanism, such as, for example, distillation. The working fluid 516 output from the separation unit 540 is fed to condenser 560 and then to compressions device 570, completing the cycle as described above.

One of the important advantages of the disclosed system and method is that it is adapted to operate in hot environments or when the cooling media temperature is above the $CO_2$ critical point (>31° C.). Higher temperatures are accommodated by controllably combining $CO_2$ with additional hydrocarbons to form azeotropic or other types of mixtures that allow for the partial condensation of the mixtures at temperatures above the $CO_2$ critical temperature. These measures optimize cycle efficiency and save compression energy, improving the overall performance of the geothermal recovery system and method.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A geothermal energy recovery system, coupled to a geothermal reservoir via an injection well and an extraction well comprising:
   a phase separator having an input port coupled to the extraction well and receiving an extracted working fluid including carbon dioxide and hydrocarbons therefrom which have been heated geothermally within the reservoir, the phase separator operative to separate liquid and vapor portions of the extracted working fluid;
   a controllable separator unit coupled downstream from the phase separator and receiving the vapor portion of the extracted working fluid therefrom, the separator unit being controllably operated to separate components of the vapor portion of the extracted working fluid based on chemical composition and to selectively mix the separated components into a modified working fluid based on detected process and ambient conditions; and
   an expander coupled downstream from the controllable separator unit and operable to generate mechanical or electrical energy from expansion of the modified working fluid.

2. The geothermal energy recovery system of claim 1, further comprising:
   a condenser coupled downstream from the expander and operable to cool the expanded working fluid; and
   a compressor device coupled downstream from the condenser and operable to increase the pressure of the working fluid received from the condenser to a pressure level suited for re-injection into the reservoir via the injection well.

3. The geothermal energy recovery system of claim 2, wherein additional carbon dioxide is introduced into the working fluid between the expander and the condenser.

4. The geothermal energy recovery system of claim 2, wherein additional carbon dioxide is introduced into the working fluid between the condenser and the compression device.

5. The geothermal energy recovery system of claim 1, wherein the separator unit is operated using a programmable electronic control unit that is configured to operate the separator unit to set a composition of the modified working fluid based upon detected ambient and process conditions received by the electronic control unit.

6. The geothermal energy recovers system of claim 5, further comprising a condenser coupled downstream from the expander and operable to cool the expanded working fluid; wherein, if the electronic control unit determines that a condensing temperature is below a critical point temperature of carbon dioxide, the electronic control unit operates the separator unit to set a composition of the modified working fluid at between 100 carbon dioxide: 0 percent ethane and 60 percent carbon dioxide: 40 percent ethane depending on another process or ambient condition.

7. The geothermal energy recovery system of claim 5, further comprising a condenser coupled downstream from the expander and operable to cool the expanded working fluid; wherein, if the electronic control unit determines that a condensing temperature is above a critical point temperature of carbon dioxide, the electronic control unit operates the separator unit to set a composition of the modified working fluid to include carbon dioxide, ethane and at least one heavier hydrocarbon than ethane.

8. A method of geothermal energy recovery comprising:
   injecting a fluid including carbon dioxide into a geothermal reservoir through an injection well;
   extracting a geothermally heated working fluid including previously injected carbon dioxide and hydrocarbons entrained in a flow of the carbon dioxide within the reservoir from an extraction well;
   separating the extracted working fluid according to phase into vapor and liquid streams;
   separating components of the vapor stream based on chemical composition;
   selectively mixing the separated components according to current conditions of the extracted working fluid to produce an output modified working fluid having a chemical composition that is optimized for energy recovery efficiency; and
   expanding the modified working fluid to generate mechanical or electrical energy.

9. The method of claim 8, further comprising:
   condensing the expanded modified working fluid;
   compressing the condensed modified working fluid to increase pressure; and reinjecting carbon dioxide at elevated pressure into the reservoir through the injection well.

10. The method of claim 9, further comprising introducing additional carbon dioxide into the modified working fluid prior to condensing.

11. The method of claim 9, further comprising introducing additional carbon dioxide into the modified working fluid prior to compressing.

12. The method of claim 8, wherein the vapor stream is separated into i) a carbon dioxide stream, ii) a light hydrocarbon stream, and ii) a heavy hydrocarbon stream.

13. The method of claim 12, further comprising condensing the expanded modified working fluid; wherein if a condensing temperature is below a critical point temperature of carbon dioxide, the modified working fluid composition is set between 100 carbon dioxide: 0 percent ethane and 60 percent carbon dioxide: 40 percent ethane depending on another process or ambient condition.

14. The method of claim 12, further comprising condensing the expanded modified working fluid; wherein, if a condensing temperature is above a critical point temperature of carbon dioxide, the modified working fluid composition is set to include carbon dioxide, ethane and at least one heavier hydrocarbon than ethane.

15. The method of claim 14, wherein the modified working fluid composition is set to include 50 percent carbon dioxide, 30 percent ethane and 20 percent propane.

16. The method of claim 8, further comprising heating the vapor stream to an elevated temperature by introducing additional oxygen into the vapor stream and partially oxidizing it prior to separating the vapor stream based on composition.

17. The method of claim 8, further comprising heating the vapor stream prior to separating components of the vapor stream based on chemical composition.

18. A geothermal energy recovery system, coupled to a geothermal reservoir via an injection well and an extraction well, comprising:

a phase separator having an input port coupled to the extraction well and receiving an extracted working fluid including carbon dioxide and hydrocarbons therefrom which have been heated geothermally within the reservoir, the phase separator operative to separate liquid and vapor portions of the extracted working fluid;

a controllable separator unit coupled downstream from the phase separator and receiving the vapor portion of the extracted working fluid therefrom, the separator unit being controllably operated to separate components of the vapor portion of the extracted working fluid based on chemical composition and to selectively mix the separated components into a modified working fluid based on a detected condensing temperature and its relation to a critical temperature of carbon dioxide; and an expander coupled downstream from the controllable separator unit and operable to generate mechanical or electrical energy from expansion of the modified working fluid.

* * * * *